(12) United States Patent
Knol et al.

(10) Patent No.: US 12,163,613 B2
(45) Date of Patent: Dec. 10, 2024

(54) HOSE

(71) Applicant: DDC ENGINEERING B.V., Deventer (NL)

(72) Inventors: Dirk Knol, Deventer (NL); Cornelis Van Barneveld, Deventer (NL)

(73) Assignee: DDC ENGINEERING B.V., Deventer (NL)

( * ) Notice: Subject to any disclaimer, the term of this patent is extended or adjusted under 35 U.S.C. 154(b) by 66 days.

(21) Appl. No.: 17/799,314

(22) PCT Filed: Feb. 2, 2021

(86) PCT No.: PCT/EP2021/052370
§ 371 (c)(1),
(2) Date: Aug. 12, 2022

(87) PCT Pub. No.: WO2021/160461
PCT Pub. Date: Aug. 19, 2021

(65) Prior Publication Data
US 2023/0072772 A1     Mar. 9, 2023

(30) Foreign Application Priority Data
Feb. 13, 2020 (NL) .................................... 2024894

(51) Int. Cl.
*F16L 39/02*     (2006.01)

(52) U.S. Cl.
CPC .................................... *F16L 39/02* (2013.01)

(58) Field of Classification Search
CPC ................................ F16L 39/005; F16L 39/02
See application file for complete search history.

(56) References Cited

U.S. PATENT DOCUMENTS

| 2,650,112 | A | * | 8/1953 | Kinkead | F16L 39/005 285/422 |
| 4,011,732 | A | * | 3/1977 | Doherty | F16L 39/005 62/50.7 |
| 4,111,466 | A | | 9/1978 | Deregibus | |
| 4,723,441 | A | * | 2/1988 | Sweeney | F16L 39/005 73/49.1 |
| 5,011,193 | A | * | 4/1991 | Porte | F16L 39/005 285/31 |

(Continued)

FOREIGN PATENT DOCUMENTS

| DE | 3814176 A1 | * | 11/1989 | ............ F16L 39/005 |
| DE | 4331194 C1 | * | 10/1994 | ............ F16L 39/005 |

(Continued)

OTHER PUBLICATIONS

International Preliminary Report on Patentability for the International Application No. PCT/EP2021/052370, dated Aug. 11, 2022, 7 pages.

(Continued)

*Primary Examiner* — Matthew Troutman
*Assistant Examiner* — Fannie Kee
(74) *Attorney, Agent, or Firm* — KDW Firm PLLC

(57) ABSTRACT

A hose includes a tubular section having an outer tube and an inner tube. The inner tube forms a liner for the outer tube. Apart from being connected by connecting means near both ends of the tubular section, the inner tube is unconnected to said outer tube.

15 Claims, 8 Drawing Sheets

(56) References Cited

U.S. PATENT DOCUMENTS

| | | | | |
|---|---|---|---|---|
| 5,054,523 | A | * | 10/1991 | Rink ................. F16L 39/005 285/123.17 |
| 5,277,455 | A | * | 1/1994 | Graves .............. F16L 39/005 285/55 |
| 8,820,794 | B1 | | 9/2014 | Betz et al. |
| 2002/0089177 | A1 | * | 7/2002 | Bonn ................. F16L 39/005 285/123.5 |
| 2003/0178842 | A1 | * | 9/2003 | Gallagher .......... F16L 39/005 285/123.15 |
| 2004/0026922 | A1 | * | 2/2004 | Carns ................ F16L 39/005 285/123.15 |
| 2006/0000515 | A1 | * | 1/2006 | Huffman ............ F16L 39/02 138/114 |
| 2015/0285421 | A1 | * | 10/2015 | Bleyer ............... F16L 39/005 285/123.15 |
| 2015/0369400 | A1 | * | 12/2015 | Dill .................... F16L 39/005 138/147 |
| 2017/0336007 | A1 | * | 11/2017 | Rappitsch .......... F16L 39/005 |
| 2019/0309885 | A1 | | 10/2019 | Shamkhi |
| 2021/0254771 | A1 | * | 8/2021 | Schulz ............... F16L 39/005 |

FOREIGN PATENT DOCUMENTS

| | | | |
|---|---|---|---|
| DE | 20303221 U1 * | 6/2003 | ............ F16L 39/005 |
| EP | 1116917 A1 * | 7/2001 | ............ F16L 39/005 |
| FR | 3127543 A1 * | 3/2023 | ............ F16L 39/005 |
| GB | 608755 A | 9/1948 | |
| WO | WO-2007065492 A1 * | 6/2007 | ............ F16L 39/005 |
| WO | 2008071637 A2 | 6/2008 | |
| WO | 2009008728 A1 | 1/2009 | |
| WO | WO-2013086191 A1 * | 6/2013 | ............ F16L 39/005 |
| ZA | 200903682 B | 4/2010 | |

OTHER PUBLICATIONS

International Search Report and Written Opinion for PCT/EP2021/052370 dated Apr. 19, 2021 (13 pages).

* cited by examiner

HOSE

This application is a national stage filing under 35 U.S.C. 371 of International Application No. PCT/EP2021/052370, filed Feb. 2, 2021, which claims priority to Netherlands Patent Application No. 2024894, filed Feb. 13, 2020, the entirety of which applications are incorporated by reference herein.

BACKGROUND OF THE INVENTION

The invention relates to a hose comprising a tubular section, said tubular section comprising an outer tube and an inner tube, wherein the inner tube forms a liner for said outer tube. The hose may be a floating hose wherein the outer tube is a float body, or the hose may be a non-floating hose, wherein the outer tube is a pipe, such as a metal pipe.

Such hoses may be used for transporting abrasive slurry in, for example, the dredging industry, the sand and gravel extraction industry, the diamond mining industry and the oil-sand industry. The internal diameter of such hoses is typically between 50 and 200 cm, for instance approximately 90 cm. Pipes for slurry transportation are generally built up of an interior wearing layer of rubber (or another polymer), and a structural outer layer. For floating hoses the outer layer forms or comprises a float body. The lining that covers the inner wall of the outer layer will eventually wear away after the hose has been used for some time, after which the hose has to be replaced, refurbished or recycled.

The invention aims to provide a hose which can be easily refurbished and/or which allows for easier inspection for damage.

SUMMARY OF THE INVENTION

To that end, according to the invention, apart from being connected by connecting means near both ends of the tubular section the inner tube is unconnected to said outer tube. Thereby a worn inner tube can be taken out of the outer tube by disconnecting the connecting means near both ends, and be replaced by a new inner tube which is inserted in the outer tube, where after the connecting means connects the new inner tube to the outer tube near both ends.

The inner tube preferably comprises first flanges at both outer ends which flanges are arranged to releasably connect two adjacent inner tubes to each other. Preferably at least one of said first flanges at at least one outer end of the inner tube is a removable first flange releasably attached to the inner tube, such that when said removable first flange is removed from the inner tube the inner tube can be moved in axial direction out of the outer tube.

Said connecting means preferably each comprise a second flange attached to and extend around the inner tube near the outer end thereof, and a third flange at the outer end of the outer tube, wherein the second flange is releasably connected to the third flange. At least one of said second flanges attached to and extending around the inner tube near at least one outer end thereof is preferably a removable second flange releasably attached to the inner tube, such that when said removable second flange is removed from the inner tube the inner tube can be moved in axial direction out of the outer tube. Preferably said removable first and/or second flange(s) comprises two or more separate circular flange sections which together form a circular flange when the flange sections are connected, wherein the inner tube is provided with a stepped portion which prevents axial movement of the removable flange towards the respective flange to which it is attached. The inner tube is preferably provided with a second stepped portion which prevents axial movement of the removable flange towards the outer end of the tubular section. Said stepped portions are preferably formed by retainer rings which are attached to and extend around the inner tube. Said second and third flanges are preferably connected to each other by means of bolts and nuts.

The outer diameter of said retainer rings is preferably smaller than or equal to the inner diameter of the outer tube, such that the inner tube can be moved out of the outer tube in axial direction. The outer diameter of the inner tube is preferably smaller than the inner diameter of the outer tube, such that there is space between the inner tube and the outer tube and the inner tube can be easily moved out of the outer tube in axial direction. Furthermore, the gap between the inner tube and the outer tube allows for an early detection of leaks, as the transported liquid will soon flow out of the gap between the tubes. The lengths of the inner tube and of the outer tube are preferably chosen such, that if no tension force is applied to either tube there is a space between the second flange and the third flange to which said second flange is connected near at least one outer end of the tubular section.

The inner tube is preferably made of flexible polymer, preferably a rubber such as NR or SBR. The outer end parts of the inner tube preferably comprise metal cylinders on which the first and second flanges are mounted. In a preferred embodiment the inner tube comprises wear resistant rings, preferably made of cast iron, hard-faced steel or a ceramic material.

BRIEF DESCRIPTION OF THE DRAWINGS

The invention will now be explained in more detail in the following description of embodiments thereof, which are illustrated in the figures, in which.

DETAILED DESCRIPTION OF THE INVENTION

Figure 1A:
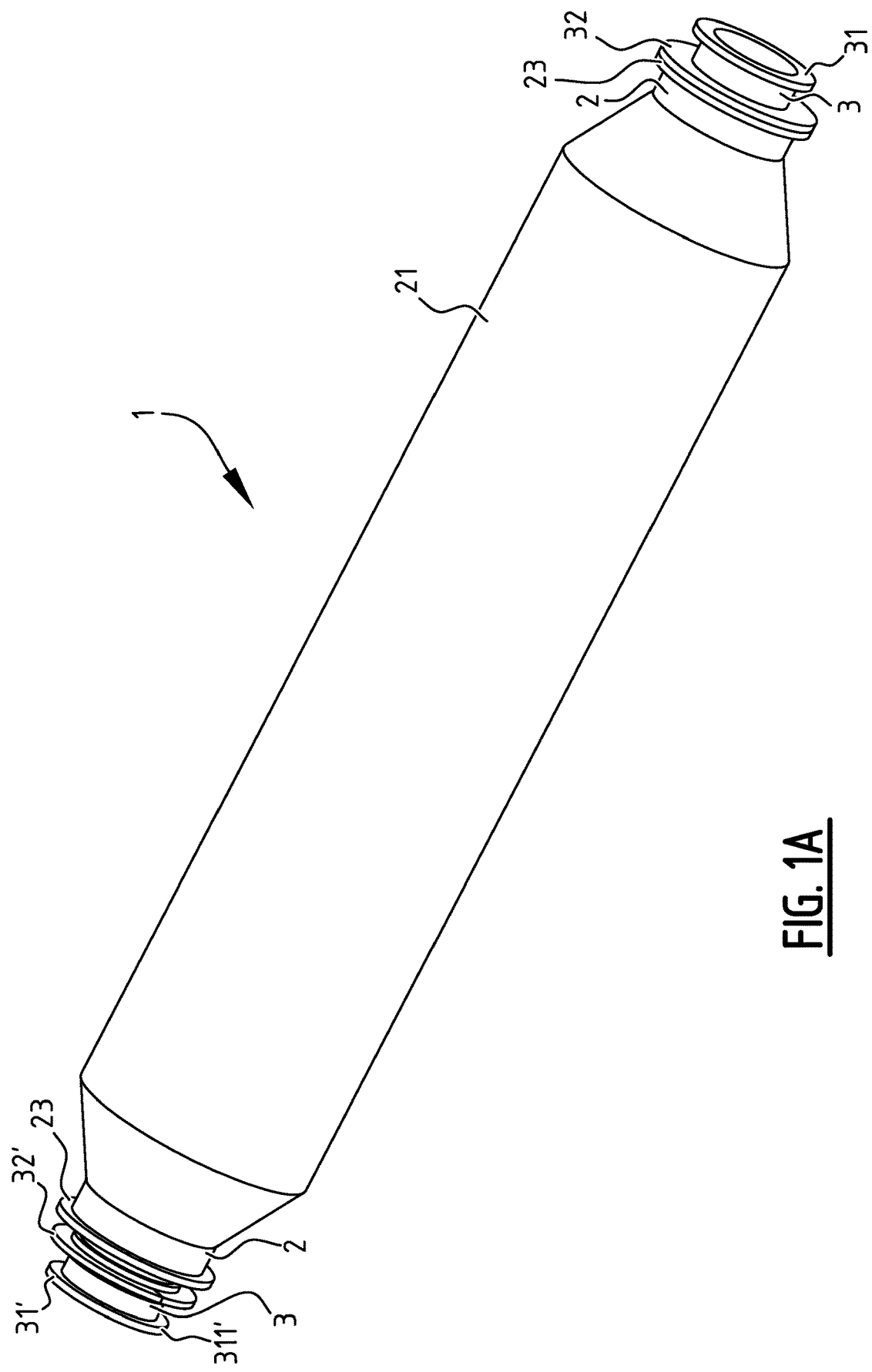
FIG. 1A is a perspective view of a floating dredging hose in accordance with the invention.
Figure 1B:
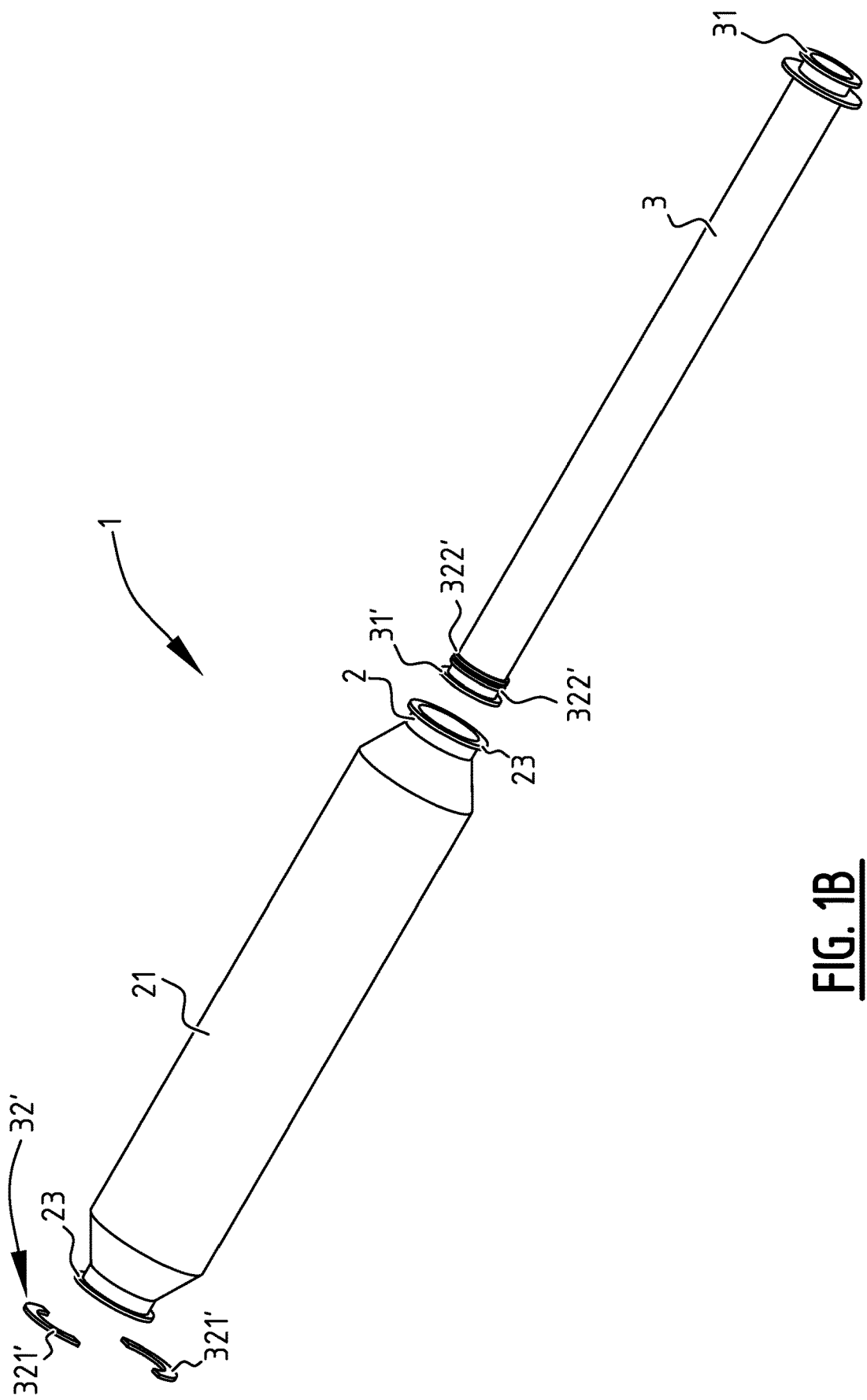
FIG. 1B is an exploded view of the floating dredging hose of FIG. 1A.
Figure 2:
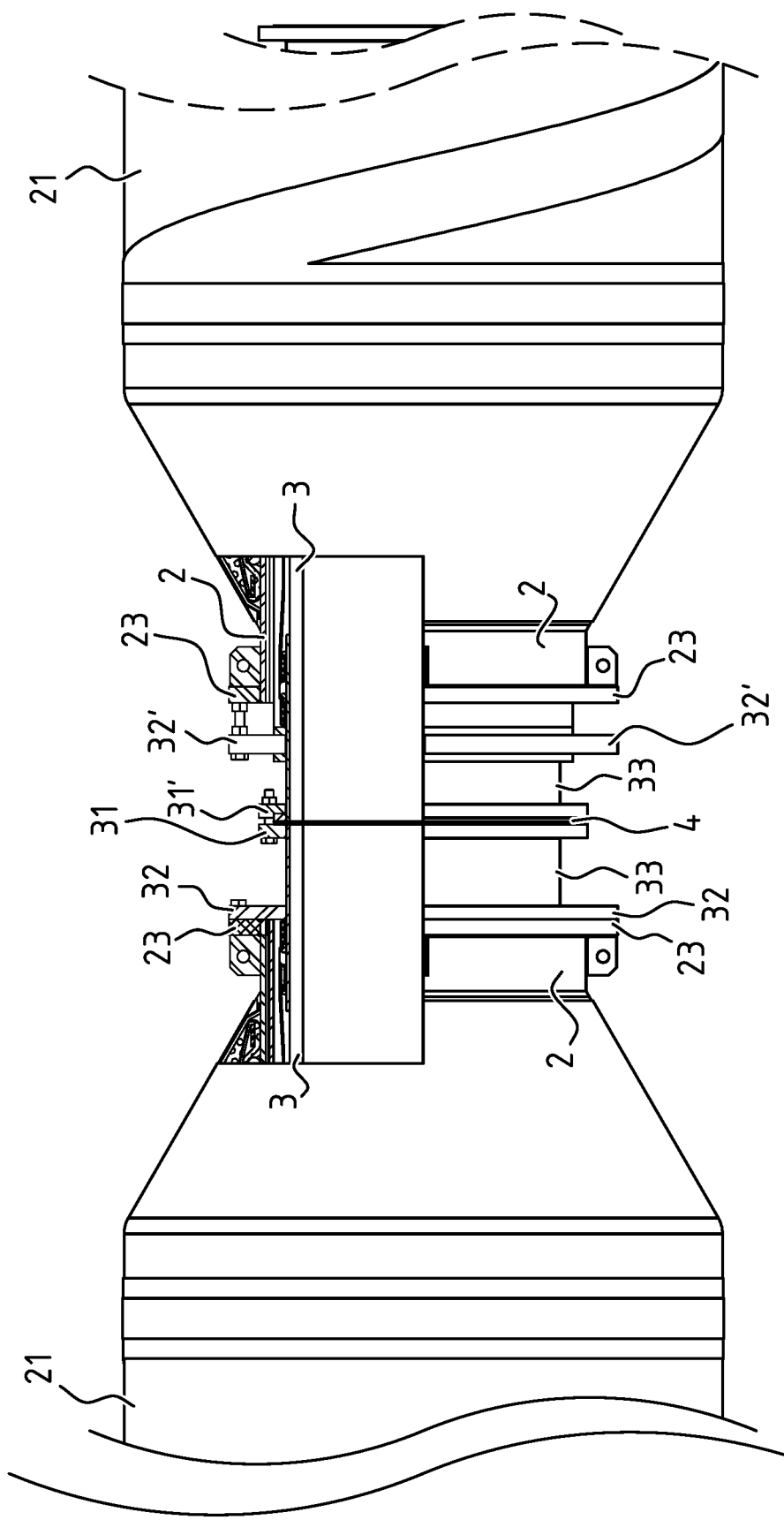
FIG. 2 is a partial cross section of two mutually connected floating dredging hoses of FIGS. 1A/1B.
Figure 3:
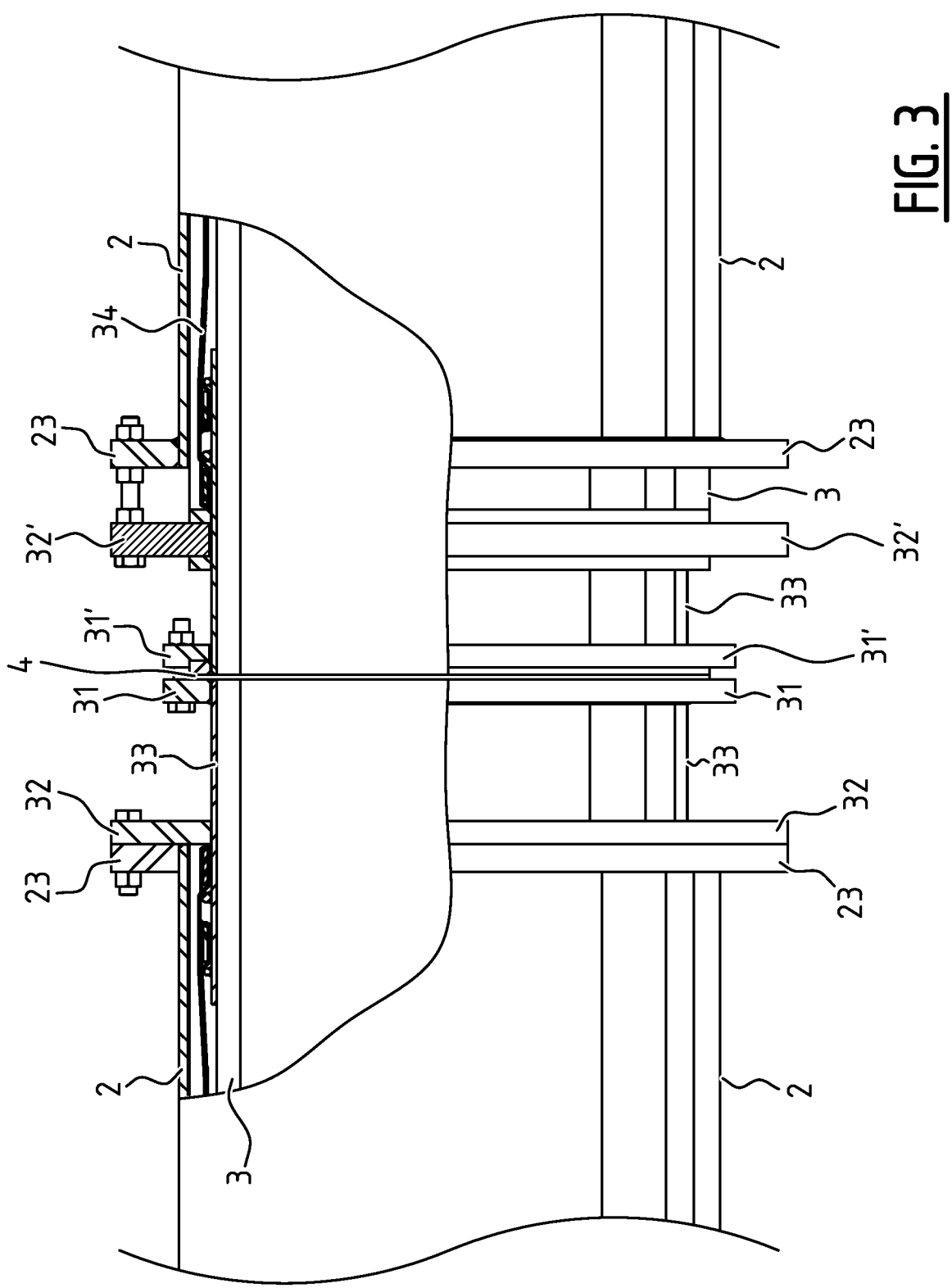
FIGS. 3 and 4 are partial cross sections of two mutually connected hoses, which may be the floating dredging hoses of FIG. 2 (shown without the float body) or which may be non floating-hoses.
Figure 4:
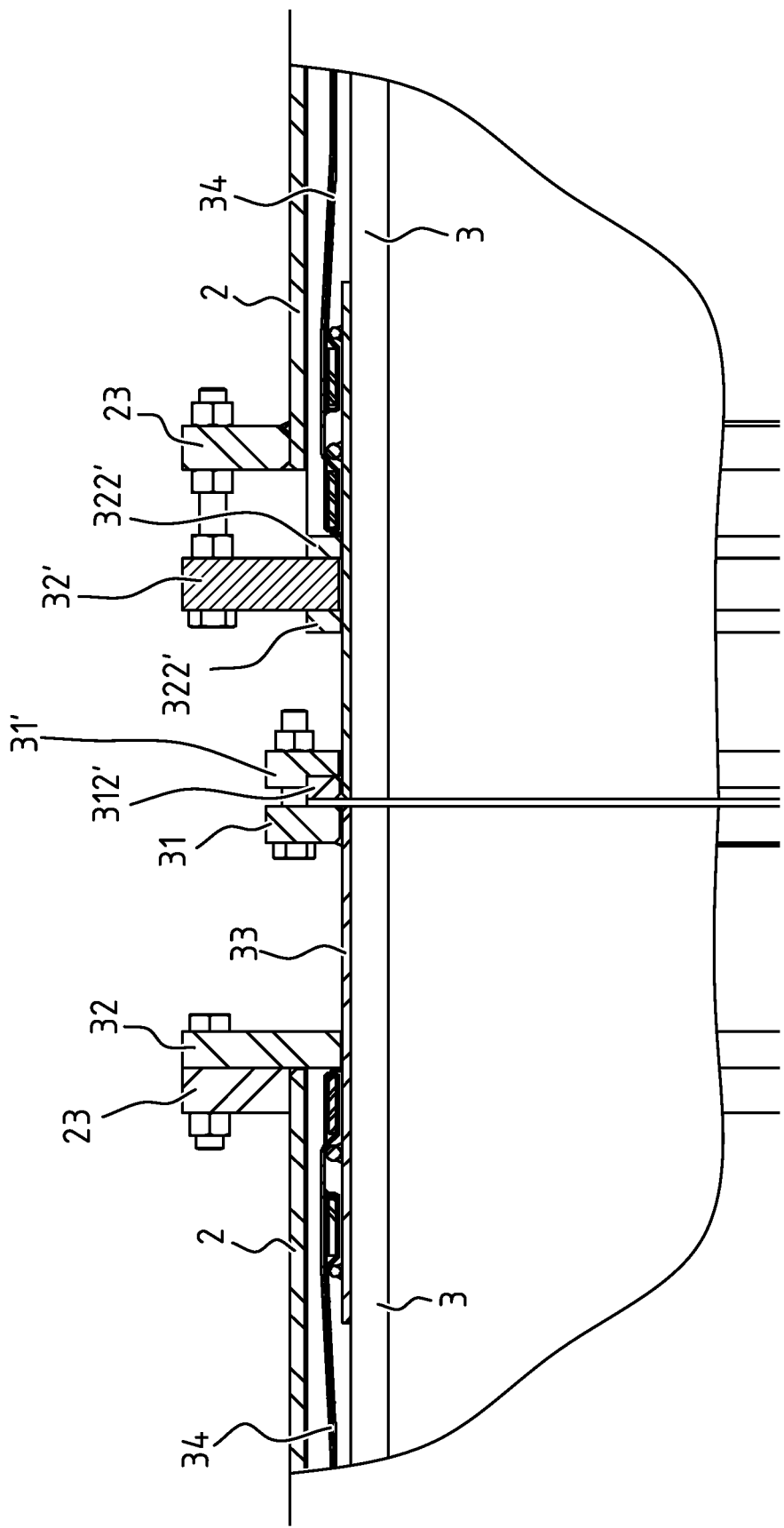
Figure 5:
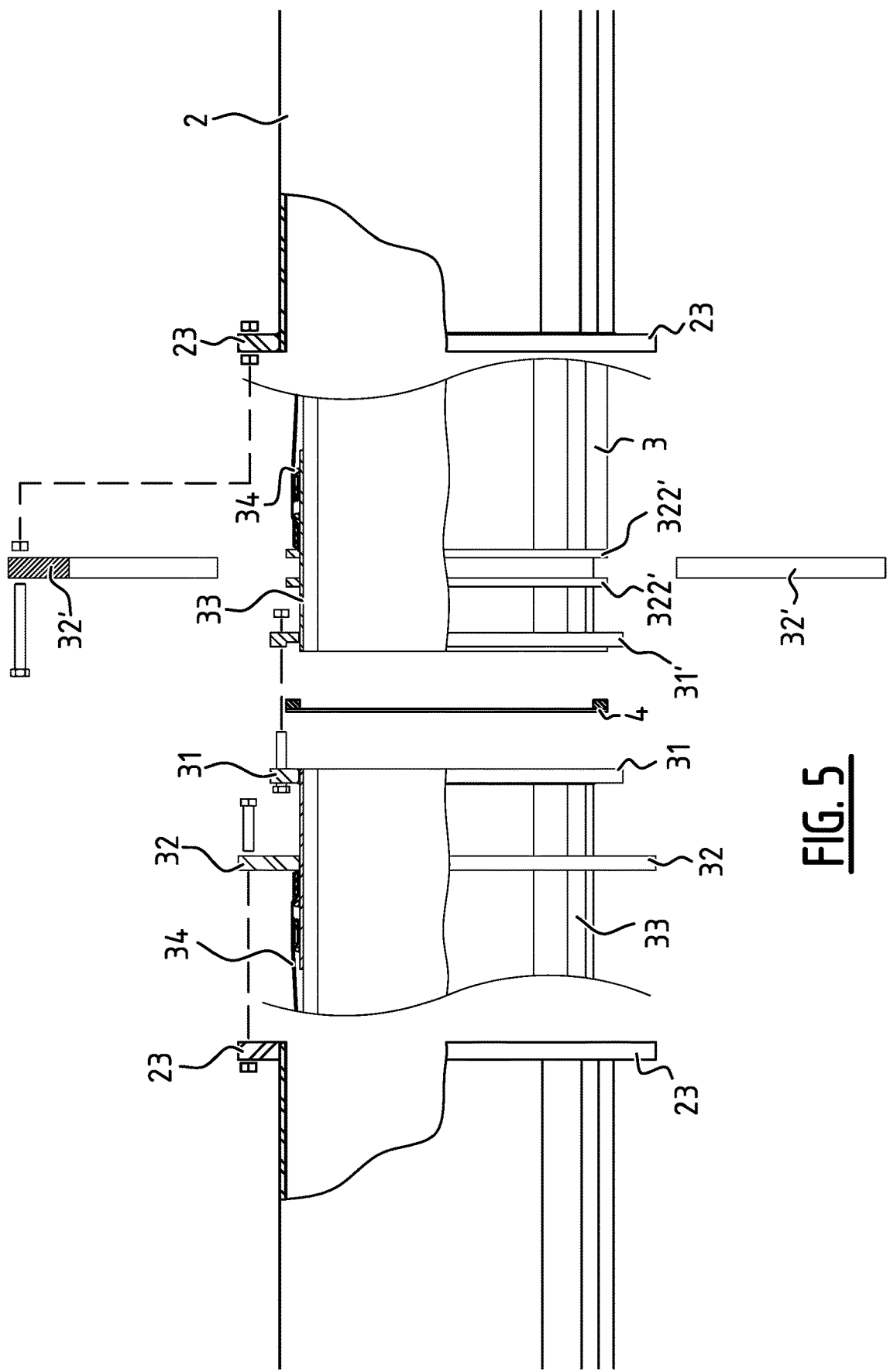
FIG. 5 is a partial cross section of two mutually connected hoses of FIGS. 3 and 4 in exploded view, wherein some elements are not shown for clarity.
Figure 6:
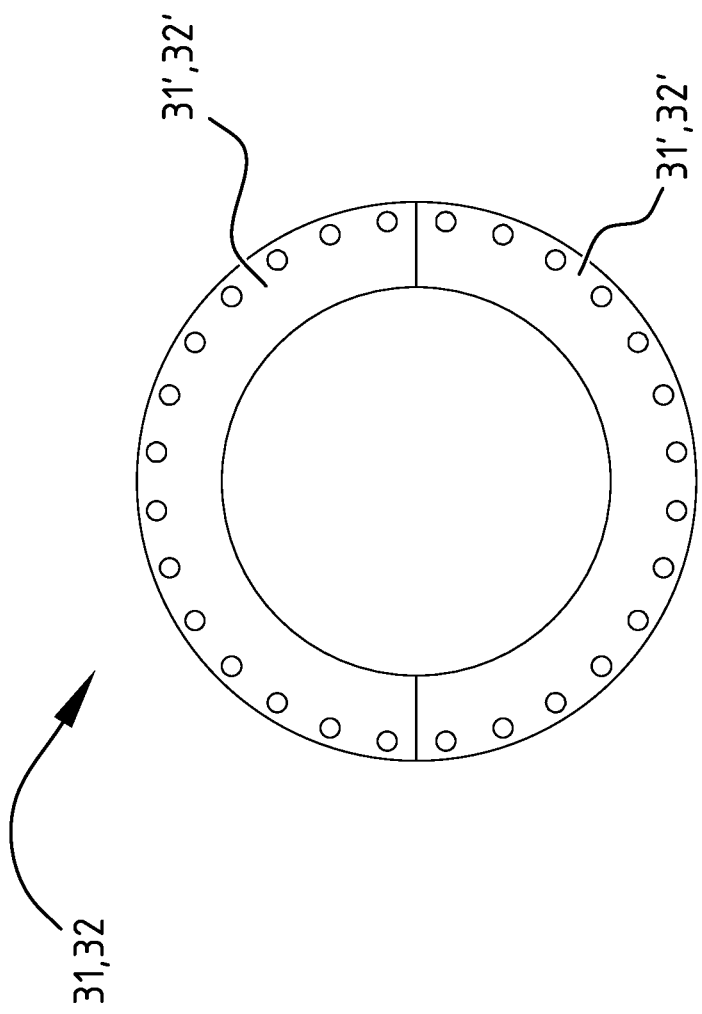
FIG. 6 is an end view of a removable flange comprising two circular flange sections.

According to FIGS. 1A/B a floating dredging hose 1 comprises a generally tubular section, which comprises an outer tube 2 and an inner tube 3. The outer tube 2 is provided with a float body 21 which is filled with a foam and which causes the floating dredging hose 1 to float on water.

Figure 7:
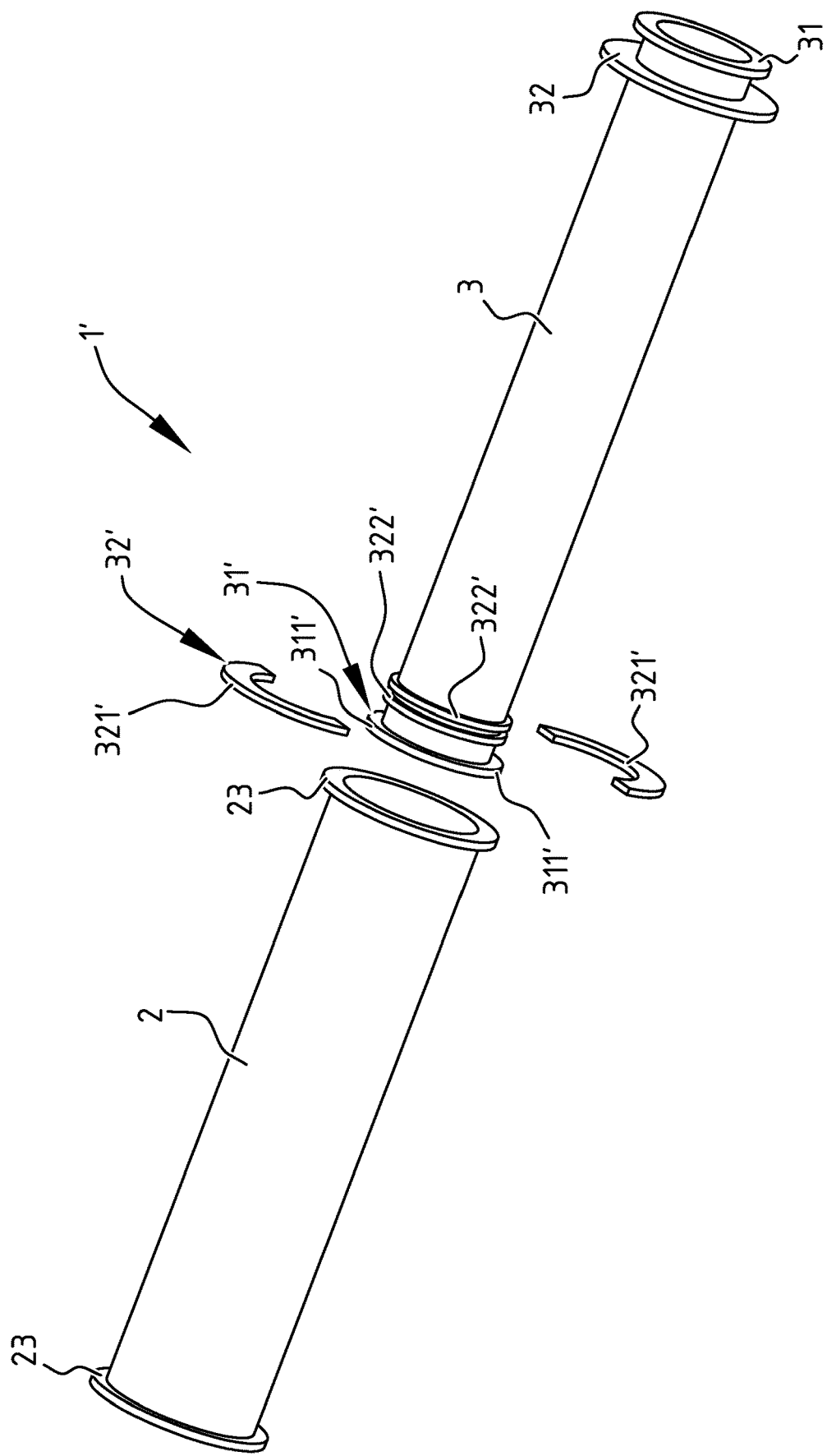
FIG. 7 is a perspective view of a non-floating hose in accordance with FIGS. 3-6.

FIG. 7 shows a non-floating hose 1', which also comprises a generally tubular section, and which comprises an outer tube 2 and an inner tube 3. The outer tube 2 of the non-floating hose 1' may be a metal pipe, which in this case is not provided with a float body 21.

According to the figures the outer end parts of the inner tube 3 comprise metal cylinders 33 on which the first flanges 31, 31' and second flanges 32, 32' are mounted. The inner tube 3 may be made of flexible polymer, preferably a rubber such as NR or SBR. The inner tube 3 may be reinforced by a layer 34 of aramid fibres, which may be attached to the metal cylinders 33 near the outer ends of the inner tube 3. The inner tube 3 may furthermore comprise wear resistant rings (not shown) embedded in said flexible polymer, which rings may be made of cast iron, hard-faced steel or a ceramic material.

The inner tube 3 is provided with first flanges 31, 31' at both outer ends which are arranged to connect two adjacent inner tubes 3 to each other by means of bolts and nuts. A rubber seal ring 4 is clamped between the outer ends of the inner tubes 3. One of said first flanges 31' at one outer end is removable and releasably attached to the inner tube 3. When said removable first flange 31' is removed from the inner tube 3 the inner tube 3 can be moved in axial direction out of the outer tube 2.

The removable first flanges 31' comprise two separate circular flange sections 311' which together form the circular flange 31 when the flange sections 311' are connected to the flange 31 of the adjacent hose 1. The inner tube 3 is provided with a stepped portion 312' at its outer end which prevents axial movement of the removable flange 31' from the inner tube 3 towards the respective flange 31 of the adjacent inner tube 3 to which it is attached.

The inner tube 3 is further provided with second flanges 32, 32' attached to and extending around the inner tube 3 near the outer end thereof. The outer tube 2 is provided with third flanges 23 at the outer end. The second flanges 32, 32' are connected to the third flanges 23 by means of bolts and nuts. One of the second flanges 32' is also removable and releasably attached to the inner tube 3, such that when said removable second flange 32' is removed from the inner tube 3 the inner tube 3 can be moved in axial direction out of the outer tube 2.

The removable second flanges 32' comprises two or more separate circular flange sections 321' which together form the circular flange 32' when the flange sections 321' are connected. The inner tube 3 is provided with retainer rings 322' which prevents axial movement of the removable flange 32' of the outer tube 2 towards the respective flange 23 to which it is attached as well as towards the outer end of the inner tube 3. The dimensions of the tubes 2, 3 are chosen such, that there is a space between the second flange 32" (or second flange 32) and the third flange 23, such that the tension with which the outer tube 2 is attached to the inner tube 3 can be adjusted.

The outer diameter of the inner tube 3 is smaller than the inner diameter of the outer tube 2, such that there is space between the inner tube 3 and the outer tube 2, which allows for an early detection of leaks, as well as easy removal and insertion of the inner tube 3. Also the outer diameter of the retainer rings 322'. 322' is smaller than or equal to the inner diameter of the outer tube 2, such that the inner tube 3 with the retainer rings 322'. 322' can be moved in and out of the outer tube in axial direction.

The invention has thus been described by means of preferred embodiments. It is to be understood, however, that this disclosure is merely illustrative. Various details of the structure and function were presented, but changes made therein, to the full extent extended by the general meaning of the terms in which the appended claims are expressed, are understood to be within the principle of the present invention. The description and drawings shall be used to interpret the claims. The claims should not be interpreted as meaning that the extent of the protection sought is to be understood as that defined by the strict, literal meaning of the wording used in the claims, the description and drawings being employed only for the purpose of resolving an ambiguity found in the claims. For the purpose of determining the extent of protection sought by the claims, due account shall be taken of any element which is equivalent to an element specified therein. An element is to be considered equivalent to an element specified in the claims at least if said element performs substantially the same function in substantially the same way to yield substantially the same result as the element specified in the claims.

The invention claimed is:

1. A hose, comprising:
   a tubular section comprising an outer tube and an inner tube,
   wherein the inner tube forms a liner for the outer tube;
   wherein, except for the inner tube being connected by a connector near both ends of the tubular section, the inner tube is unconnected to the outer tube;
   wherein the connector at each end of the tubular section comprises an inner tube flange, which is attached to and extends around the inner tube near an outer end thereof, and an outer tube flange, which is at an outer end of the outer tube;
   wherein the inner tube flange is releasably connected to the outer tube flange;
   where the inner tube flange of at least one of the connectors is a removable inner tube flange comprising two or more separate circular flange sections which together form a circular flange when the flange sections are connected;
   wherein the removable inner tube flange is releasably attached to the inner tube, such that, when the removable inner tube flange is removed from the inner tube, the inner tube is movable in an axial direction out of the outer tube; and
   wherein the inner tube is provided with a stepped portion which prevents axial movement of the removable flange towards the respective flange to which the inner tube is attached.

2. The hose in accordance with claim 1, wherein the inner tube comprises, at both outer ends, further inner tube flanges that are arranged to releasably connect two adjacent inner tubes to each other.

3. The hose in accordance with claim 2, wherein at least one of the further inner tube flanges, at least at one outer end of the inner tube, is a removable further inner tube flange releasably attached to the inner tube, such that, when the removable further inner tube flange is removed from the inner tube, the inner tube can be moved in the axial direction out of the outer tube.

4. The hose in accordance with claim 1, wherein the inner tube is provided with a second stepped portion which prevents axial movement of the removable inner tube flange towards an outer end of the tubular section.

5. The hose in accordance with claim 4, wherein the stepped portions are formed by retainer rings which are attached to and extend around the inner tube.

6. The hose in accordance with claim 5, wherein an outer diameter of the retainer rings is smaller than or equal to an inner diameter of the outer tube, such that the inner tube can be moved out of the outer tube in an axial direction.

7. The hose in accordance with claim 1, wherein the inner and outer tube flanges are connected to each other by bolts and nuts.

8. The hose in accordance with claim 1, wherein an outer diameter of the inner tube is smaller than an inner diameter of the outer tube, such that there is space between the inner tube and the outer tube and the inner tube can be moved out of the outer tube in an axial direction.

9. The hose in accordance with claim 1, wherein lengths of the inner tube and of the outer tube are chosen such that if no tension force is applied to either tube there is a space between the inner tube flange and the outer tube flange, to which the inner tube flange is connected near at least one outer end of the tubular section.

10. The hose in accordance with claim 1, wherein the hose is a floating hose, and wherein the outer tube is a floating body.

11. The hose in accordance with claim 1, wherein the hose is a non-floating hose, and wherein the outer tube is a pipe.

12. The hose in accordance with claim 11, wherein the outer tube is a metal pipe.

13. The hose in accordance with claim 1, wherein the inner tube is made of flexible polymer.

14. The hose in accordance with claim 13, wherein the inner tube is made of a rubber and/or is reinforced by a layer of aramid fibers.

15. The hose in accordance with claim 1, wherein outer end parts of the inner tube comprise metal cylinders on which the inner tube flanges are mounted.

\* \* \* \* \*